United States Patent [19]
Chang et al.

[11] Patent Number: 5,606,476
[45] Date of Patent: Feb. 25, 1997

[54] ALTITUDE INSENSITIVE AIR BEARING SLIDER

[75] Inventors: Ciuter Chang, Fremont; Yiao-Tee Hsia, Pleasanton, both of Calif.

[73] Assignee: Read-Rite Corporation, Milpitas, Calif.

[21] Appl. No.: 501,950

[22] Filed: Jul. 13, 1995

[51] Int. Cl.⁶ ........................................................ G11B 5/60
[52] U.S. Cl. .................................................... 360/103
[58] Field of Search ............................................ 360/103

[56] References Cited

U.S. PATENT DOCUMENTS

| | | | |
|---|---|---|---|
| 5,287,235 | 2/1994 | Cunningham et al. | 360/103 |
| 5,430,591 | 7/1995 | Takeuchi et al. | 360/103 |
| 5,438,467 | 8/1995 | Dorius et al. | 360/103 |

FOREIGN PATENT DOCUMENTS 2278485  11/1994  United Kingdom ................... 360/103

*Primary Examiner*—John H. Wolff
*Attorney, Agent, or Firm*—Nathan N. Kallman

[57] ABSTRACT

The air bearing surface of an air bearing slider is formed with first and second side rails and a central recess. The rails are configured to have an inverted U-shaped section and a connecting partial trapezoidal-type section. The U-shaped section has a base joined to two spaced legs, wherein one leg is preferably longer than the other. A continuous recess is provided between the legs of each side rail and extends from the base towards the trailing end of the slider and adjacent to the trapezoidal-type section. The slider is effectively insensitive to changes in air pressure, particularly in variations in altitude, so that a substantially constant flying height can be maintained.

11 Claims, 2 Drawing Sheets

ALTITUDE INSENSITIVE AIR BEARING SLIDER

FIELD OF THE INVENTION

This invention relates to magnetic heads and in particular to an air bearing slider for use in disk drive applications that require constant flying height characteristics and/or operate at relatively high altitudes.

Description of the Prior Art

Magnetic head assemblies that fly relative to rotating magnetic disks are used extensively in disk drives for recording and reading data. One objective when using flying heads on which at least one magnetic transducer is deposited in a transducing relationship with a magnetic recording disk is to obtain a very close spacing between the transducer and the disk surface. By maintaining a close spacing, it is possible to record short wavelength or high frequency signals thereby realizing high density and high storage capacity data recording. A problem with flying the slider close to the disk surface is that when there is any variation of slider flying height, the possibility of increasing interference between the slider and the disk may result in reliability problems and head crashes. It is highly desirable to fly the head slider at a substantially constant flying height close to the disk surface, and to minimize flying height variations when operating the disk drive in a different environment, since variations in head-to-disk spacing adversely affect signal amplitude and resolution as well as having head crashes.

Air bearing sliders used in disk drives typically have a leading edge and a trailing edge at which thin film transducers are deposited. Generally, the sliders have tapered portions at the leading edge and longitudinal rails that extend from the tapers to the trailing edge. The tapers may be shaped and of such length as to provide fast pressure buildup during takeoff of the slider from a rest position to a flying attitude relative to the disk with controlled pitch. The dimensions and shapes of the tapers and rails are instrumental in determining the flying characteristics of the head. The rail design determines the pressure generated at the air bearing surface of the slider. In effect, the pressure distribution underneath the slider contributes to the flying characteristics, including flying height and pitch and roll of the head relative to a rotating magnetic disk.

When using disk drives that incorporate rotating magnetic disks and magnetic heads with air bearing sliders at relatively high altitudes, such as 10,000 feet above sea level for example, the less dense air and lower air pressure affect the slider aerodynamic characteristics which contribute to the flying action of the air bearing slider. At high altitudes, prior art sliders experience less aerodynamic lift force, as much as 30% at 10,000 feet, with a resultant loss of slider flying height, in the range of 20–40% of the nominal design flying height. As a result, the head slider is spaced closer to the rotating disk surface leading to severe head-to-disk interaction so that head crashes and excessive head-disk wear become more probable and disk drive reliability is detrimentally affected.

SUMMARY OF THE INVENTION

An object of this invention is to provide an air bearing slider that offers constant flying height characteristics and also experiences minimal flying height loss at high altitudes.

According to this invention, the air bearing surface of an air bearing slider that is used with a magnetic head arm suspension is configured to provide constant flying height characteristics and to compensate for loss of flying height of the slider which occurs at relatively high altitudes. The slider is formed with a central relief recess bounded by two shaped rails. The rails are formed with a U-shaped section and a partial trapezoidal-type section. With this kind of rail configuration, the shaped rails provide an aerodynamic lift force to the slider and a subambient pressure region is provided between the legs of the U-shaped section and continues to an area adjacent to the trapezoidal-type section. A suction force created by the subambient pressure and the preload force provided by the head suspension to which the slider is mounted oppose the lift force. Since the strength of positive pressure and subambient pressure increases with increasing disk velocity, with proper design of the rail shape and the etched recesses and etch depth, the desired constant flying height characteristic can be achieved. While operating at high altitude, the strength of both the positive and subambient pressure will be decreased by the less dense air thus minimizing flying height loss.

BRIEF DESCRIPTION OF THE DRAWINGS

The invention will be described in greater detail with reference to the drawing in which.

DETAILED DESCRIPTION OF THE INVENTION

Figure 1:
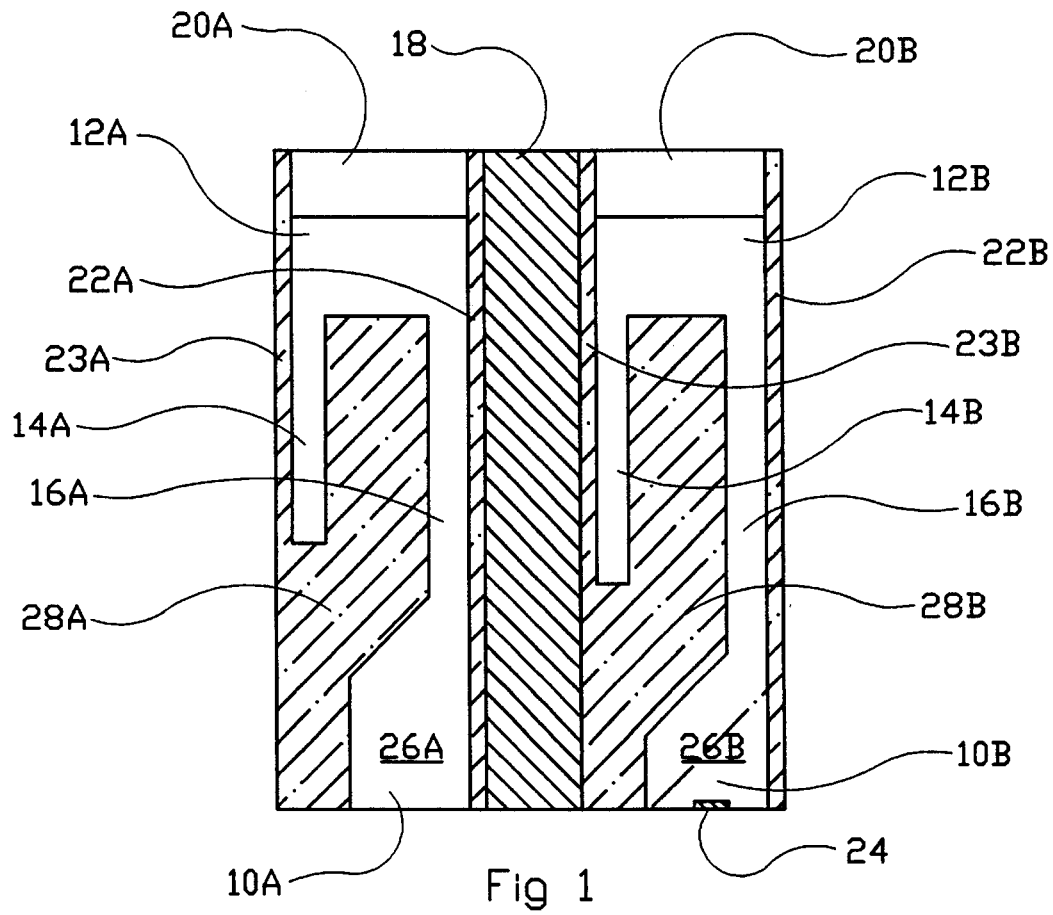
FIG. 1 is a plan view depicting the configured air bearing surface (ABS) of an air bearing slider, made in accordance with this invention.
Figure 2:
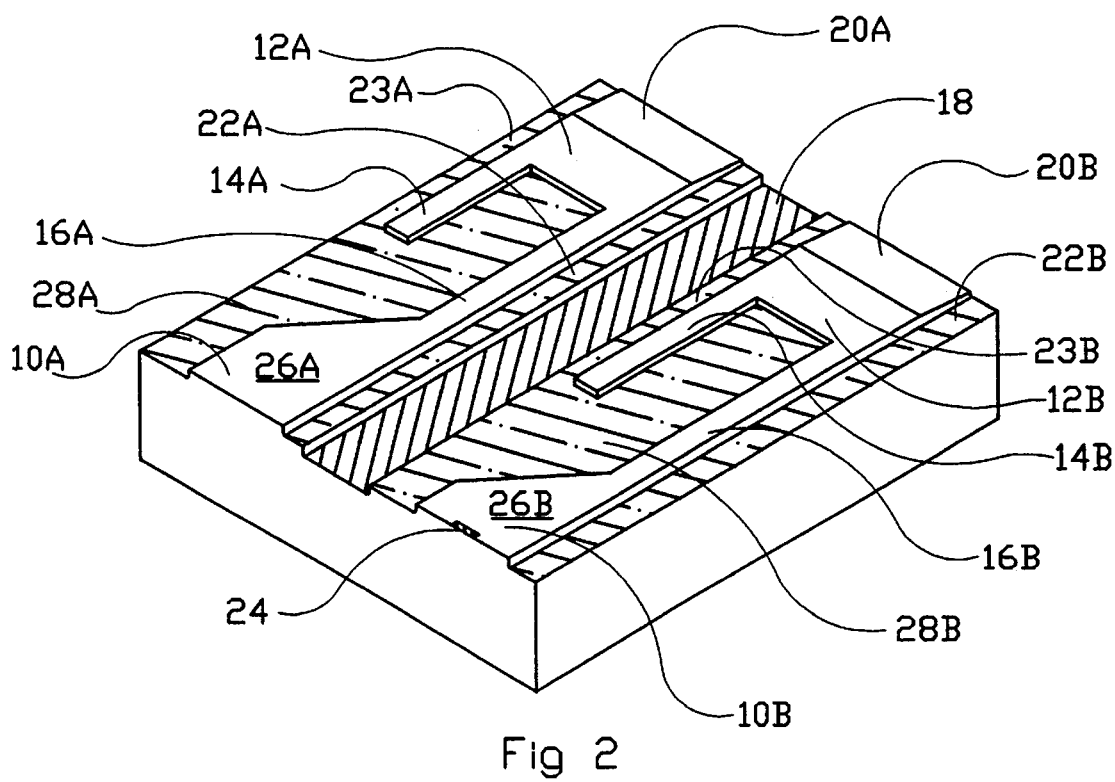
FIG. 2 is an isometric view of the slider of FIG. 1.

With reference to FIG. 1, the air bearing surface of an air bearing slider, which has a leading end and a trailing end, is formed with substantialy identically shaped rails 10A,10B but with some differences in dimensions. For clarity of description, the configuration of rail 10A will be described as it is to be understood that the rail 10B has a substantially similar geometry, excepting for the lengths of the spaced legs 14A, 14B, 16A, 16B of the rails. Rail 10A is formed with an inverted U-shaped section having a base 12A, a first leg 14A and an opposing leg 16A, with the legs 14A and 16A joined to the base 12A. In this implementation of the invention, the leg 14A is shorter than the leg 16A. A central recess 18 extends from the leading end continuously to the trailing end of the slider. Leading end tapers 20A and 20B are provided adjacent to the rails 10A and 10B respectively to enable fast takeoff of the slider from rest or its home position. A rail defined step 22A is provided along the length of the slider between the rail 10A and the central recess 18 to protect the slider from rail chipping and cracking. A similar rail defined step 22B is provided at the periphery of the slider adjacent to the rail 10B. Additionally rail defined steps 23A and 23B are provided. A magnetic transducer 24 is disposed at the trailing end of the rail 10B for interaction with a magnetic medium, such as a magnetic disk. If desired, a second transducer may be disposed at the trailing end of rail 10A.

In addition to the U-shaped section, the rail 10A is formed with a partial trapezoidal-type section 26A that has a first portion with an angular side defining an angle in the range of 30°–60°, and a rectangular second portion that extends to the trailing end of the slider. A continuous recess 28A extends from the base 12 to the trailing end of the slider and angles along the angular side of the trapezoidal-type section 26A, and converges following the direction of the angled side of the partial trapezoidal section to become narrower as the recess 28A approaches the slider trailing end.

The second rail 10B is formed with a substantially similar design as the first rail 10A. The rail 10B has an inverted U-shaped section with a base 12B, leg 14B and a longer leg 16B, which is also longer than the corresponding leg 16A of the rail 10A. The rail 10 B also has a partial trapezoidal-type section 26B with an angled portion and a rectangular portion terminating at the trailing end of the slider. Since the leg 16B is longer than leg 16A, the rectangular portion of the section 26B is shorter than the corresponding rectangular portion of the rail 10A.

Figure 3:
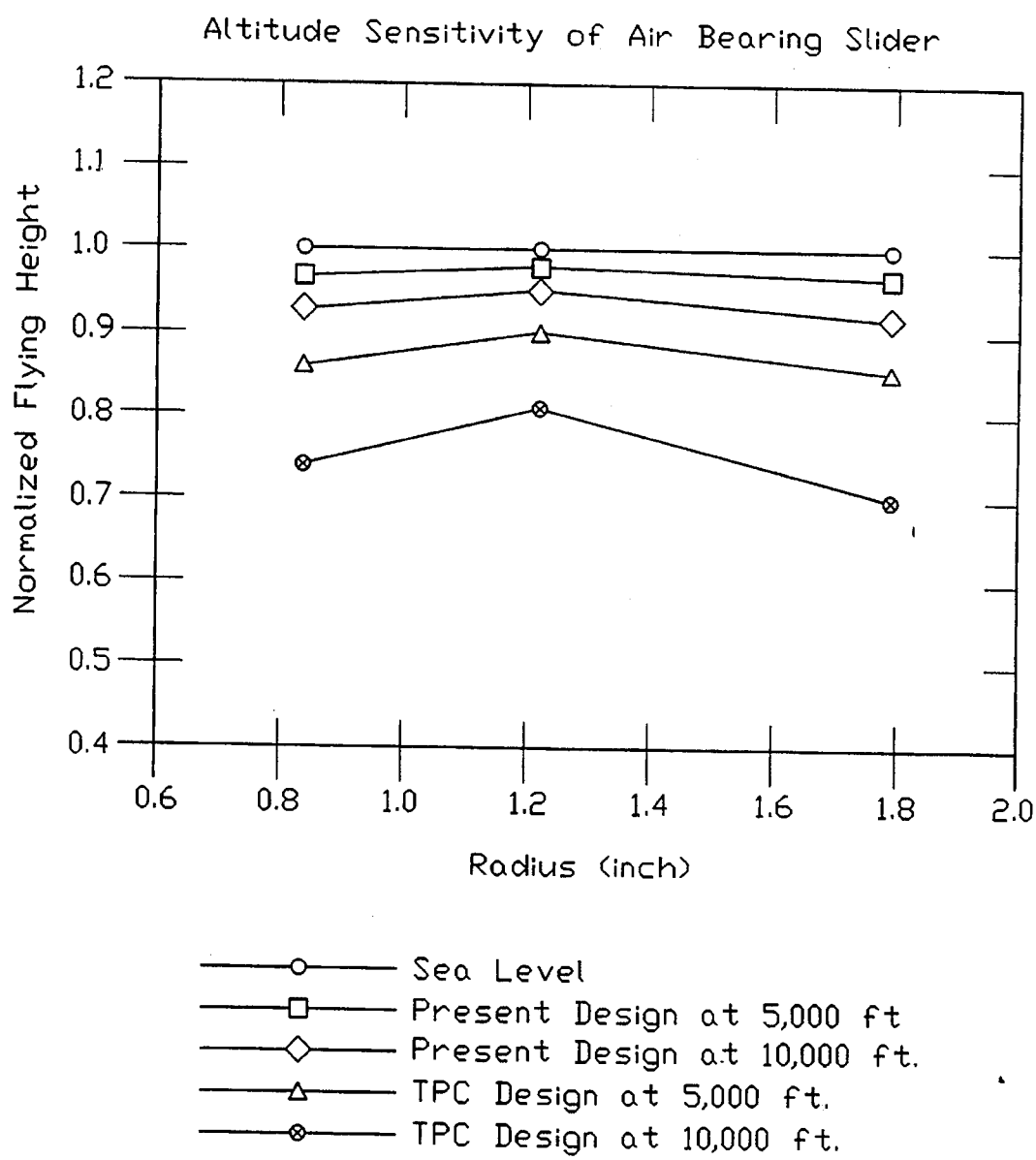
FIG. 3 is a plot of normalized flying height versus disk radius showing the altitude sensitivity of the air bearing slider of the present invention as compared to prior art transverse pressure contour (TPC) designs for operation at different altitudes.

The plot of FIG. 3 provides a comparison of the altitude sensitivity of the slider design of this invention and the prior art transverse pressure contour (TPC) sliders commonly used in the prior art obtained by modeling. The flying height of the inventive slider disclosed herein manifests least flying height loss at 5,000 feet and at 10,000 feet above sea level. Table I presents the results of slider action when operating in a disk drive with the magnetic disk rotating at about 7,200 rpm (revolutions per minute). Note that the flying height stays within a narrow range at sea level, 5,000 feet and 10,000 feet altitude for the same parameters of disk radius, skew angle of the slider relative to the disk data tracks, and that the pitch angle and roll angle of the slider remains within a relatively narrow range at the different altitudes. By virtue of the slider design disclosed herein, the magnetic performance and reliability of the disk drive at high altitudes are enhanced. In effect, the slider geometry compensates for the decrease in both positive and subambient pressure, which is applied to the slider during flying operation, that occurs at higher altitudes. The preload force applied typically by means of a flexure and load beam is balanced with the lift force and negative pressure force to realize a substantially constant flying height at high altitudes.

In an implementation of the slider design, a nanoslider was used, which is about 0.080 inch long, 0.063 inch wide and 0.017 inch thick. With such slider, the length of each taper 20 is about 10% of the slider length, and the combined length of each taper 20 and the adjacent base 12 is about 20–30% of the total length of the slider. The width of each taper 20A and 20B, which is the same as the width of each adjoining rectangular base 12A and 12B, is about 30–45% of the total width of the nanoslider. The width of each leg 14A, 14B, 16A, 16B is preferably about 3–6 milliinches. In a picoslider type, which measures about 0.049 inch in length, 0.039 inch in width and 0.012 inch in thickness, the width of each leg would be about 2–4 milli-inches. The length of the legs 14A, 14B measured from the tapers 20A, 20B is about 40% of the slider length but may be extended up to 80% of the slider length depending upon disk drive design. The lengths of the legs of a picoslider would have substantially the same proportions to the total length of the slider as delineated with respect to a nanoslider. The width of each rectangular portion of the partial trapezoidal-type sections is about 20–30% of the width of the slider, or less if the width of each taper is narrower than 35% of the slider width. The angle of the angled side of the angled portion of the trapezoidal type section is about 30°–60°. The central recess 18 may be formed by mechanical saw cutting or plasma etching or laser ablation, by way of example, to a depth exceeding 400 microinches. The recesses 28A and 28B are formed by a single step of reactive ion etching or ion milling or laser etching techniques to a depth in the range of 40–160 microinches approximately. The recesses 28A and 28B and the rail defined steps 22A, 22b, 23A, 23B are formed substantially to the same depth.

It should be understood that the geometry, dimensions and parameters described above may be modified within the scope of the invention. For example, the widths and lengths of the legs and bases of the U-shaped sections, portions of the trapezoidal type sections, and the leading edge tapers may be modified depending upon the disk drive operating characteristics and the altitudes of drive operation. Also the dimensions of parts of one rail, such as the legs and base of the inverted U-shaped section and of the trapezoidal type section, may differ from the corresponding parts of the other rail. Also the etch depths of the recesses 28A and 28B may differ for different applications. The legs and trapezoidal type sections may have rounded, arcuate or angled corners instead of being rectangular with 90° corners. Other modifications may be made when implementing the invention for a particular environment.

TABLE I

| Drive Operate at 7200 rpm | Radius (inch) | Skew Angle (degree) | Flying Height (µ inch) | Pitch Angle (µ radian) | Roll Angle (µ radian) | Subambient Force (gram) | Positive Force (gram) |
|---|---|---|---|---|---|---|---|
| Sea Level | | | | | | | |
| | 0.84 | −10.5 | 2.42 | 152 | 10 | −2.8 | 6.3 |
| | 1.22 | 2.5 | 2.53 | 214 | 7 | −3.1 | 6.6 |
| | 1.79 | 16.5 | 2.52 | 304 | 3 | −3.5 | 7.0 |
| 5,000 ft | | | | | | | |
| | 0.84 | −10.5 | 2.34 | 157 | 7 | −2.4 | 5.9 |
| | 1.22 | 2.5 | 2.49 | 224 | 4 | −2.6 | 6.1 |
| | 1.79 | 16.5 | 2.44 | 320 | 1 | −2.8 | 6.3 |
| 10,000 ft | | | | | | | |
| | 0.84 | −10.5 | 2.25 | 161 | 3 | −2.0 | 5.5 |
| | 1.22 | 2.5 | 2.44 | 232 | 1 | −2.1 | 5.6 |
| | 1.79 | 16.5 | 2.31 | 332 | 0 | −2.2 | 5.7 |

What is claimed is:

1. An air bearing slider having a leading end and a trailing end comprising:

first and second tapers formed at said leading end;

a central recess extending from said leading end between said tapers to said trailing end;

first and second side rails disposed on each side of said central recess and extending from said first and second tapers repectively towards said trailing end, said rails configured with substantially similar geometries, each rail having an inverted U-shaped section with a base, and first and second legs stemming from the outer portions of said base, and each rail having a partial trapezoidal section extending from one of said legs of said U-shaped section; and first and second recesses formed to a depth in the range between 40–160 microinches approximately between said first and second legs of each of said side rails respectively and extending from said base towards said trailing end;

whereby said configured rails and said recesses cause said slider to be effectively insensitive to variations in altitude so that substantially constant flying height of said slider is maintained at different altitudes.

2. An air bearing slider as in claim 1, wherein the second leg of said U-shaped section is longer than said first leg.

3. An air bearing slider as in claim 1, wherein said first leg of said first rail is of a different length than said first leg of said second rail.

4. An air bearing slider as in claim 1, including rail defined steps extending from said leading end to said trailing end.

5. An air bearing slider as in claim 4, wherein said rail defined steps are of the same depth as said first and second recesses.

6. An air bearing slider as in claim 1, wherein the combined length of said first taper and said base of said first rail measured along the length of said slider is about 20–30% of the total length of the slider.

7. An air bearing slider as in claim 1, wherein said slider is dimensioned as a nanoslider, and the width of each of said legs is about 3–6 milli-inches.

8. An air bearing slider as in claim 1, wherein said slider is dimensioned as a picoslider, and the width of each of said legs is about 2–4 milli-inches.

9. An air bearing slider as in claim 1, wherein said first and second recesses are formed to a depth of about 40–160 microinches by a single reactive ion etching step or by ion milling or by laser etching.

10. An air bearing slider as in claim 1, wherein said first and second recesses are etched to different depths.

11. An air bearing slider as in claim 1, wherein said partial trapezoidal type section of said second rail is different in total area than said partial trapezoidal type section of said first rail.

* * * * *